UNITED STATES PATENT OFFICE.

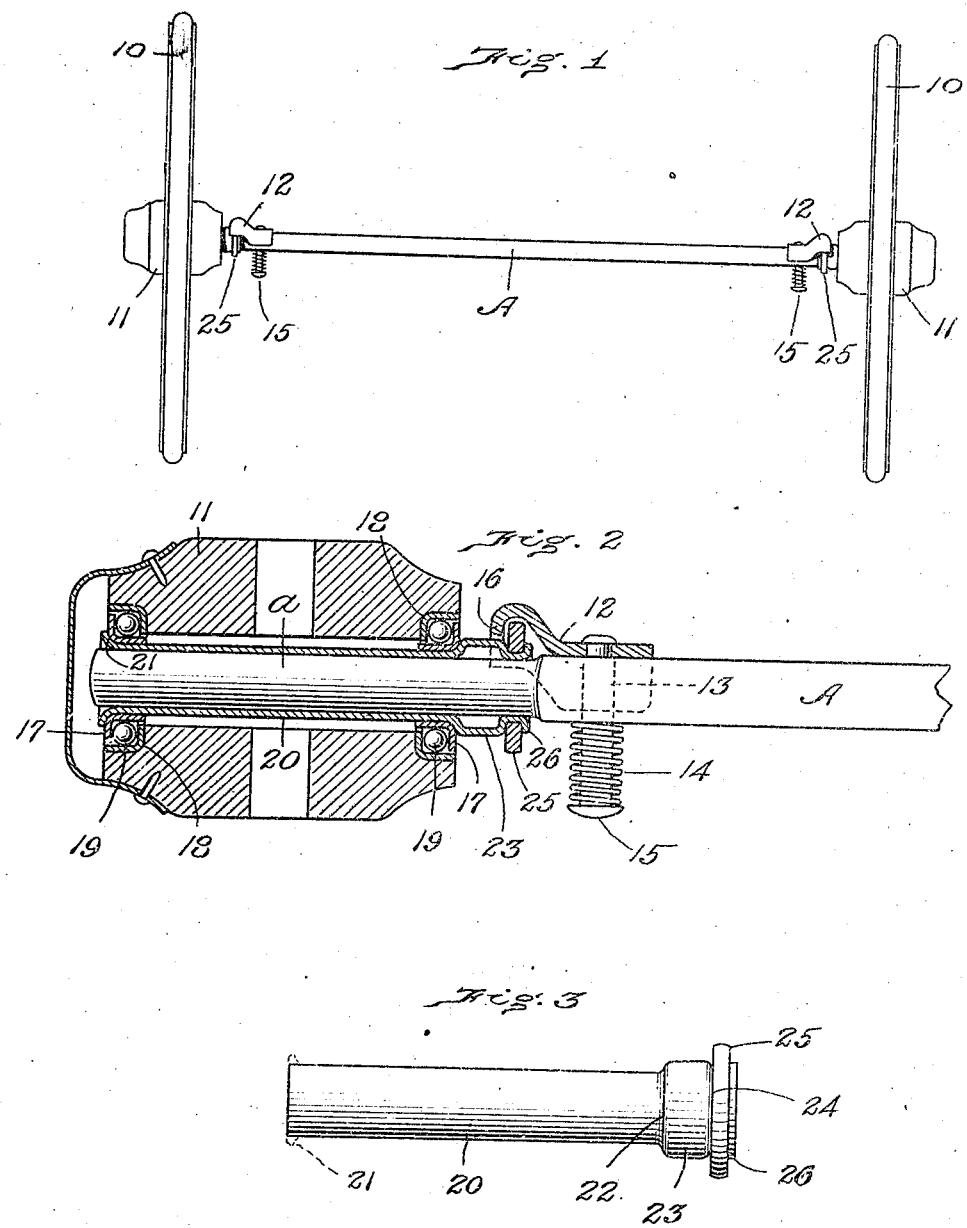

OTTO W. SIEBERT, OF GARDNER, AND JOHN R. H. BUNTIN, OF EAST TEMPLETON, MASSACHUSETTS; SAID BUNTIN ASSIGNOR TO SAID SIEBERT.

ANTIFRICTION-WHEEL.

1,188,337.      Specification of Letters Patent.      Patented June 20, 1916.

Application filed March 15, 1916. Serial No. 84,323.

*To all whom it may concern:*

Be it known that we, OTTO W. SIEBERT and JOHN R. H. BUNTIN, citizens of the United States, residing, respectively, at Gardner and East Templeton, both in the county of Worcester and State of Massachusetts, have invented new and useful Improvements in Antifriction-Wheels, of which the following is a specification.

This invention relates to anti-friction wheels, and particularly to those of the type used on baby carriages.

For convenience in packing, and for transporting baby carriages from the manufacturer to the dealer, the wheels are detached from the axles, and the dealer is under the necessity of attaching them. This practice has led to the adoption of "nutless" wheels, so called because the axles are provided with latches, and the wheel hubs are provided with flanges adapted to coact with said latches to keep the wheels on the axles. The use of latches instead of nuts has proven satisfactory for the purpose stated, but in the meantime the demand for anti-friction wheels has increased to such an extent that manufacturers have adopted the manufacture of the latter. Anti-friction wheels have displaced the latches hereinbefore mentioned, because the manufacturers have not hitherto devised any wheel structure capable of utilizing anti-friction bearings in conjunction with such latching devices.

Our present invention combines anti-friction bearings and latching devices in such manner as to eliminate relative movement, and consequently friction, so far as the latching devices are concerned, and as a result the wheel is anti-friction in every respect.

Of the accompanying drawings, which illustrate the present invention: Figure 1 represents an elevation including a wheel axle, two wheels mounted thereon, and latching devices carried by the axle and arranged to keep the wheels thereon. Fig. 2 represents a longitudinal sectional view, on a larger scale, through the hub portion of such wheel and through the adjacent latching device on the axle. Fig. 3 represents an elevation of the sleeve that is used to confine the anti-friction bearing elements in the hub and to coact with the latching device to keep the wheel on the axle.

The same reference characters indicate the same parts wherever they occur.

The wheels are indicated at 10, 10, and their hubs are indicated at 11, 11. Two latching devices, of well known construction, are included in Fig. 1, and one of them is included in Fig. 2. Each latching device comprises a member 12 of pressed sheet metal, a stem 13, and a helical compression spring 14. The stem extends through a hole in the axle A and is movable endwise. It has a head 15, and the spring 14 is compressed between such head and the axle. As shown by Figs. 1 and 2, upward pressure against the head 15 will lift the stem against the stress of the spring, and will thus move the member 12 to release the wheel. The member 12 has a flange 16 whereby the wheel is held upon the axle as hereinafter explained.

The drawings illustrate a wood wheel, but it is to be understood that the invention is capable of being embodied in an all metal wheel. According to the structure as illustrated, the ends of the hub 11 are counterbored for the reception of two sets of anti-friction bearing elements. Each set comprises inner and outer annular members 17 and 18 and a series of rolling members 19. In the present instance the rolling members are balls, but it is well understood that rolling members of other shapes are sometimes used instead of balls, especially when the wheels are intended to carry heavy loads. The members 17 and 18 are, in the present instance, the "cone" and "cup" respectively of the bearing structure. A sleeve 20 extends through and is sustained by both cone members 17. As shown by Fig. 2, the left-hand end portion of this sleeve is flared, providing a shoulder 21. The flaring operation by which this shoulder is produced is performed after the anti-friction bearing elements have been assembled in the hub and after the sleeve has been inserted through the members 17. Prior to such insertion the sleeve is in the condition shown by solid lines in Fig. 3. It has a shoulder 22 which, in the present instance, is produced by forming a bulging portion 23. This bulging portion provides another shoulder, indicated at 24, and an annular flange member 25 is carried by the sleeve and confined between shoulder 24 and flared end 26. This flange member 25 is arranged to coact with flange 16 of latching device 12, to keep the wheel on the axle. Although the flange member 25 as here shown is made of a separate piece and attached to the sleeve, it is, to all intents and purposes, an integral part of the sleeve when assembled therewith, and it may be so regarded, especially as it is, in effect, merely an extension of the flange portion 26 of the sleeve.

When the two sets of anti-friction bearing elements have been assembled in the hub, and when the sleeve 20 has been passed through the annular members 17, the left-hand end portion of the sleeve is subjected to the flaring operation whereby the shoulder 21 is produced. The two annular members 17 thus become confined between shoulders 21 and 22, and the two sets of bearing elements are confined in the hub.

The end portions of the axle, one of which is indicated at $a$ in Fig. 2, are adapted to go into the sleeves 20. In "nutless" wheels as hitherto made, the friction due to rotation of the wheel has occurred between the axle and the sleeve corresponding to sleeve 20, and between such sleeve and the latching device carried by the axle. In the present instance, however, the anti-friction bearing elements between the sleeve 20 and the hub of the wheel enable the sleeve to remain stationary upon the axle while the wheel rotates on the balls 19. Inasmuch as the friction between the hub and sleeve 20 is less than that between the sleeve and the axle, the sleeve will not turn, and we have therefore utilized this non-turning sleeve to coact with the latching device 12, in this way utilizing the advantages of the latching device without subjecting the wheel to any friction in consequence thereof.

We believe that we are the first to have provided an anti-friction connection between a wheel and a latching device of the character shown.

So far as the load-sustaining function of the anti-friction bearings is concerned, and so far as the structure of the anti-friction bearings is concerned, we do not claim any improvement, but we believe it is new to utilize the load-sustaining anti-friction elements in conjunction with a latching device to keep the wheel on the axle, and we believe it is new to utilize one and the same sleeve to form connection between the wheel and the latching device and to confine the anti-friction bearing elements in the wheel.

We claim:

1. In combination, a wheel, a sleeve extending therethrough, a wheel axle having an end portion adapted to go into said sleeve, a latch carried by said axle and adapted to lap said sleeve, said sleeve having a flange arranged to coact with said latch to keep said sleeve on said axle, and anti-friction bearing elements arranged between said wheel and said sleeve to enable said wheel to turn relatively to said sleeve.

2. In combination, a wheel, anti-friction bearing elements arranged therein, and a sleeve extending through and sustained by said bearing elements, one end of said sleeve projecting beyond said bearing elements and having a flange whereby it may be held against endwise movement.

3. In combination, a wheel, two sets of anti-friction bearing elements arranged therein, and a sleeve extending through both said sets of bearing elements and sustained thereby, said sleeve having confronting shoulders confining said bearing elements in said wheel, one end of said sleeve having a flange whereby it may be held against endwise movement.

4. In combination, a wheel, an axle therefor, anti-friction bearing means arranged to connect said wheel and axle to sustain the load on the latter, said means including a non-rotating element, and a latching device carried by said axle and arranged to coact with said non-rotating element to keep said wheel on said axle.

In testimony whereof we have affixed our signatures.

OTTO W. SIEBERT.
JOHN R. H. BUNTIN.